(12) United States Patent
Wesser et al.

(10) Patent No.: US 12,498,559 B2
(45) Date of Patent: Dec. 16, 2025

(54) OPTICAL APPARATUSES

(71) Applicant: Rosemount Aerospace Inc., Burnsville, MN (US)

(72) Inventors: Aaron Wesser, Minneapolis, MN (US); Phillip Acott, Burnsville, MN (US); Mark Sherwood Miller, Lakeville, MN (US); Jaime Sly, Savage, MN (US); Joshua A. Boelman, Farmington, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 463 days.

(21) Appl. No.: 18/138,477

(22) Filed: Apr. 24, 2023

(65) Prior Publication Data

US 2024/0353670 A1 Oct. 24, 2024

(51) Int. Cl.
| | |
|---|---|
| *G02B 26/02* | (2006.01) |
| *G01S 7/481* | (2006.01) |
| *G02B 6/42* | (2006.01) |
| *H04B 10/40* | (2013.01) |

(52) U.S. Cl.
CPC .......... *G02B 26/023* (2013.01); *G01S 7/4813* (2013.01); *G02B 6/4246* (2013.01); *H04B 10/40* (2013.01); *G02B 2006/4297* (2013.01)

(58) Field of Classification Search
CPC ............... G02B 6/4246; G02B 26/023; G02B 2006/4297; G01S 7/4813; G01S 7/497; G01S 17/87; G01S 17/933; G01S 17/95; H04B 10/40

USPC ......................................... 356/3–22; 359/227
See application file for complete search history.

(56) References Cited

U.S. PATENT DOCUMENTS

| | | |
|---|---|---|
| 4,422,758 A | 12/1983 | Godfrey et al. |
| 5,872,626 A | 2/1999 | Lipscomb |
| 2021/0194592 A1 | 6/2021 | Schaeffer |

FOREIGN PATENT DOCUMENTS

| | | | |
|---|---|---|---|
| CN | 110133621 A | 8/2019 | |
| KR | 20190131413 A | * 11/2019 | ........... G01S 7/4816 |

OTHER PUBLICATIONS

European Patent Office, Extended European Search Report received in EP Application No. 24171269.4, Sep. 2, 2024, 6 pages.

* cited by examiner

*Primary Examiner* — Jessica M Merlin
(74) *Attorney, Agent, or Firm* — Suiter Swantz IP

(57) ABSTRACT

An optical apparatus can be configured to cover an optical transceiver. At least a portion of the apparatus can be configured to move relative to the transceiver between a block state wherein the apparatus is configured to block transmission from a transmitter of the optical transceiver to a receiver of the optical transceiver as well as block emission from the transmitter to the atmosphere, and one or more transmit states wherein the apparatus is configured to allow at least partial transmission from the transmitter of the optical transceiver to a receiver of the optical transceiver while blocking emission from the transmitter to the atmosphere.

19 Claims, 7 Drawing Sheets

OPTICAL APPARATUSES

FIELD

This disclosure relates to optical apparatuses, e.g., for optical transceivers for use on aircraft.

BACKGROUND

Laser based technology is often accompanied by certain safety risks from laser hazards, most commonly eye related injuries. To mitigate the risk of laser exposure, safety measures such as use of personal protective equipment (PPE) and laser keep out zones are often implemented. These precautions are only as effective as the individuals carrying out the defined safety procedures. Additionally, there is a desire to keep the optical surfaces protected and clean prior to operation and for longer term storage, as well as to protect the transceiver in feedback testing. Such conventional methods and systems have generally been considered satisfactory for their intended purpose. However, there is still a need in the art for improvements. The present disclosure provides a solution for this need.

SUMMARY

An optical apparatus can be configured to cover an optical transceiver. At least a portion of the apparatus can be configured to move relative to the transceiver between a block state wherein the apparatus is configured to block transmission from a transmitter of the optical transceiver to a receiver of the optical transceiver as well as block emission from the transmitter to the atmosphere, and one or more transmit states wherein the apparatus is configured to allow at least partial transmission from the transmitter of the optical transceiver to a receiver of the optical transceiver while blocking emission from the transmitter to the atmosphere.

In certain embodiments, the apparatus can include a base portion configured to attach to an optical transceiver, and a movable portion connected to the base portion and configured to move relative to the base portion between the block state and the one or more transmission states. In certain embodiments, the base portion can include a transmitter channel defined through the base portion and configured to allow optical communication between the transmitter of the optical transceiver and the moveable portion, and a receiver channel defined through the base portion and configured to allow optical communication between the receiver of the optical transmitter the moveable portion.

In certain embodiments, the moveable portion includes one or more blocking structures configured to prevent radiation from traveling from the transmitter channel to the receiver channel when the moveable portion is in the block state. In certain embodiments, the transmitter channel and receiver channel align with a respective transmit channel and receive channel of the optical transceiver.

The moveable portion can define a transmission aperture dimensioned to allow at least some radiation to travel from the transmitter to the receiver in the one or more transmission states. The transmission aperture can be configured to attenuate radiation from the transmitter to reduce incident radiation power on the receiver when in the one or more transmission states. In certain embodiments, the transmission aperture can include an angled surface configured to allow gradual transmission between the transmitter channel and the receiver channel based on a position of the movable portion relative to the base portion.

In certain embodiments, the moveable portion can include optical power sensor opening configured to receive an optical power sensor and which can be in optical communication with the transmission channel in a power sense state. In certain embodiments, the power sense state can be the block state such that the transmitter channel and the receiver channel are not in optical communication in the power sense state.

In certain embodiments, the apparatus can include a first gasket between the movable portion and the base portion to prevent radiation leakage. The first gasket can respective openings for the transmitter channel and the receiver channel. In certain embodiments, the apparatus can include a second gasket can be configured to be between the base portion and the transceiver housing to prevent radiation leakage. The second gasket can have respective openings for the transmitter channel and the receiver channel. In certain embodiments, the movable portion can be made of a material and/or otherwise have optical properties configured to attenuate radiation from the transmitter to the receiver to a power level below a maximum limit of the receiver.

In certain embodiments, the moveable portion can be mounted to the base portion via one or more slotted fasteners to limit motion between a maximum transmission state of the one or more transmission states and the block state. In certain embodiments, the one or more slotted fasteners are configured to selectively compress the moveable portion against the base portion to fix the moveable portion to the base portion to hold a state of the apparatus.

In accordance with at least one aspect of this disclosure, a transceiver assembly can include an optical transceiver having a transmitter and a receiver, and an optical apparatus. The optical apparatus can be or include any suitable embodiment of an apparatus disclosed herein, e.g., as described above.

In accordance with at least one aspect of this disclosure, at least a portion of the apparatus being configured to move relative to the transceiver between a block state wherein the apparatus is configured to block transmission from a transmitter of the optical transceiver to a receiver of the optical transceiver or block emission from the transmitter to the atmosphere, and one or more transmit states wherein the apparatus is configured to allow at least partial transmission from the transmitter of the optical transceiver to the receiver of the optical transceiver or to the atmosphere.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
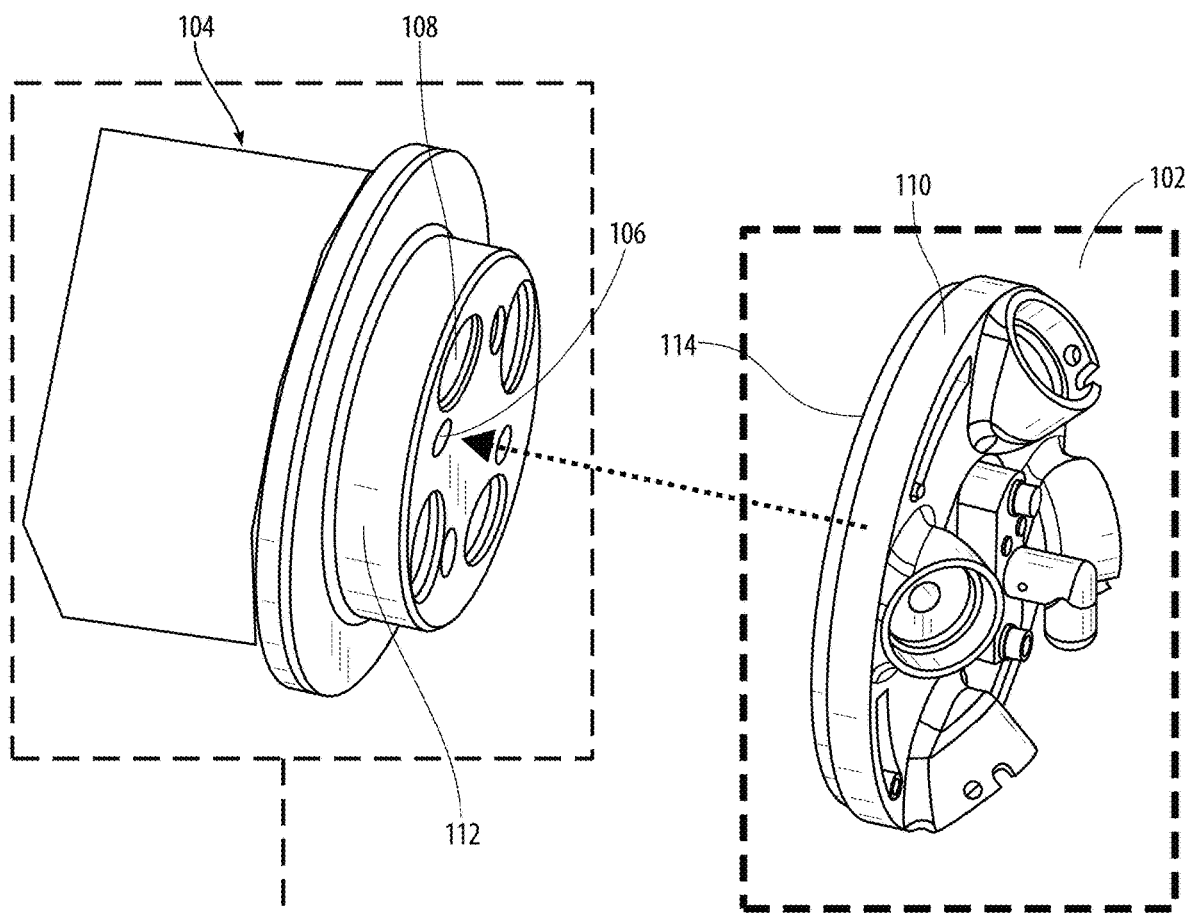
FIG. 1 is a perspective view of an embodiment of an assembly having an embodiment of an apparatus in accordance with this disclosure.

Reference will now be made to the drawings wherein like reference numerals identify similar structural features or aspects of the subject disclosure. For purposes of explanation and illustration, and not limitation, an illustrative view of an embodiment of an assembly in accordance with the disclosure is shown in FIG. 1 and is designated generally by reference character 102. Other embodiments and/or aspects of this disclosure are shown in FIGS. 2-6.

Laser based remote sensing involves the use of a laser beam as an optical probe of a surrounding environment from a distance. An optical transceiver can be used in a laser based remote sensing system to transmit a light pulse and a receiver with sensitive detectors can measure the reflected light. The optical transceiver can provide access to the environment being monitored by the laser remote sensing system. The optical transceiver can include one or more optical telescopes. The optical telescopes can be either co-axial (e.g., the same telescope can be used for transmitting and receiving) or bi-static (e.g., a separate transmitting and receiving telescope can be used working in tandem with one another). The use of such lasers comes with health and safety concerns, both to an individual user, as well as to the surfaces of the transceiver, which can be damaged while on the ground (e.g., in an aircraft setting). For aircraft use, system checks are helpful to maintain safety standards and a method to provide such optical feedback, or "loop-back" type signal is can be useful.

As shown in FIG. 1, an optical apparatus 102 can be configured to cover an optical transceiver 104. The optical apparatus 102 can be removeable from the optical transceiver 104 and/or be configured to be fixed to the optical transceiver in any suitable manner. The optical transceiver 104 can have any suitable number of emitters and receivers (e.g., four pairs as shown). At least a portion of the apparatus 102 can be configured to move relative to the transceiver 104 between a block state wherein the apparatus 102 is configured to block transmission from a transmitter 106 of the optical transceiver 104 to a receiver 108 of the optical transceiver 104 as well as block emission from the transmitter 106 to the atmosphere, and one or more transmit states wherein the apparatus 102 is configured to allow at least partial transmission from the transmitter 106 of the optical transceiver 104 to a receiver 108 of the optical transceiver 104 while blocking emission from the transmitter 106 to the atmosphere.

In certain embodiments, the apparatus 102 can include a base portion 110 configured to attach to an optical transceiver (e.g., to a housing 112 of the optical transceiver), and a movable portion 114 connected to the base portion 110 and configured to move relative to the base portion 110 between the block state and the one or more transmission states. In certain embodiments, the base portion 110 can include a transmitter channel 116 defined through the base portion 110 and configured to allow optical communication between the transmitter 106 of the optical transceiver 104 and the moveable portion 114, and a receiver channel 118 defined through the base portion 110 and configured to allow optical communication between the receiver 108 of the optical transmitter 104 the moveable portion 114.

In certain embodiments, the optical apparatus 102 can be integrated with the optical transceiver and/or the housing 112 thereof, for example. In certain such embodiments, there may not be a base portion 110 as the housing 112 or other optical transceiver components can form a base for the moveable portion 114 to be mounted thereon.

Figure 2:
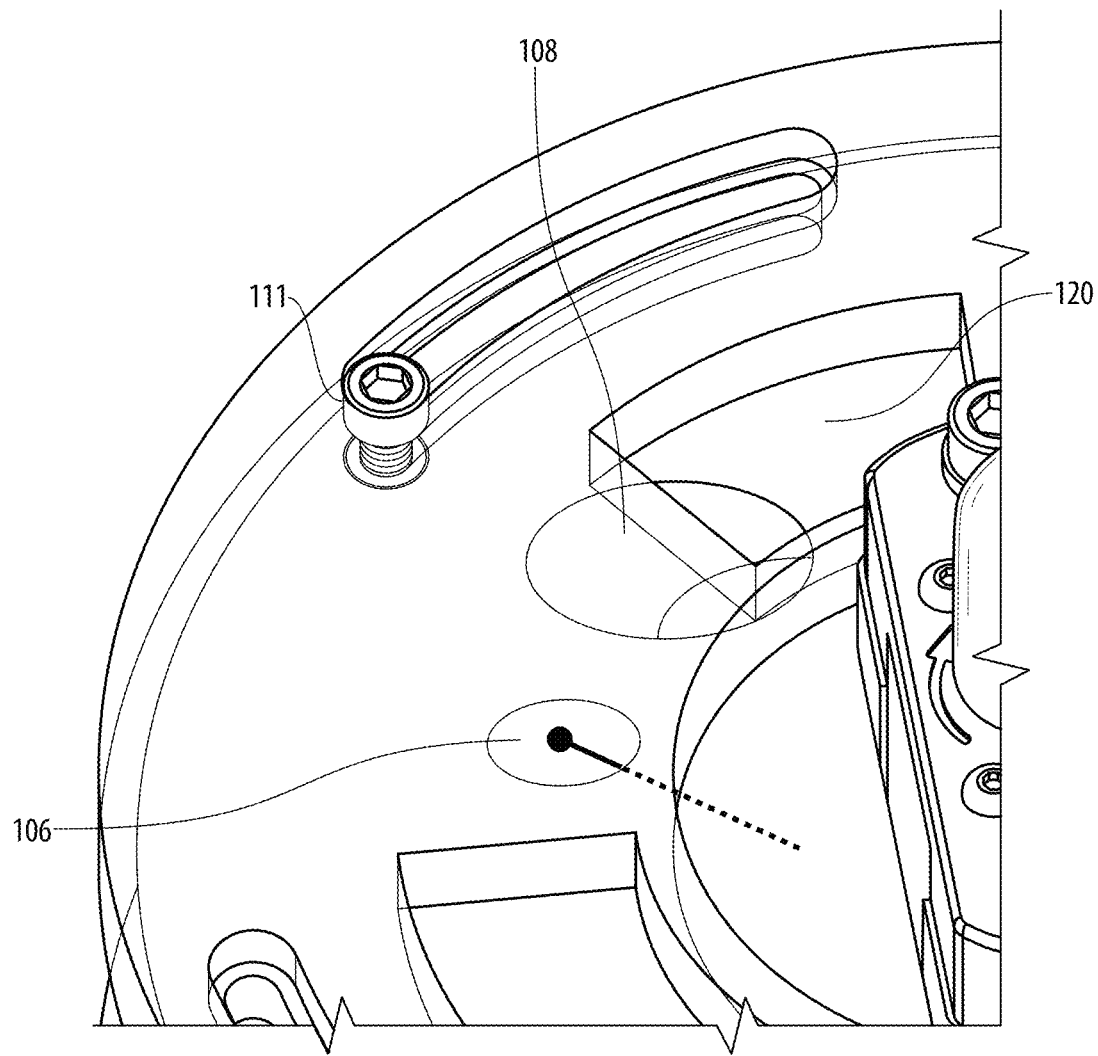
FIG. 2 is a partial view of the apparatus of FIG. 1, shown in a block state.
Figure 3:
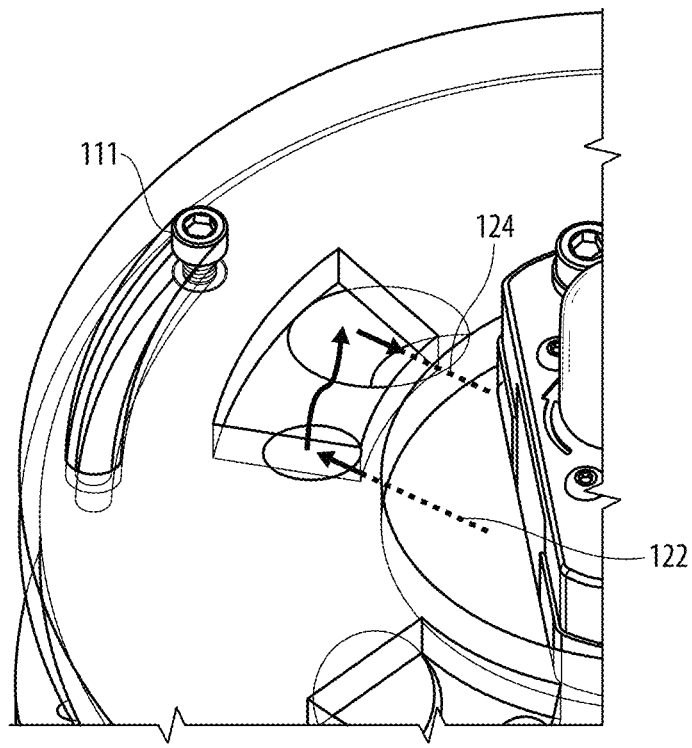
FIG. 3 is a partial view of the apparatus of FIG. 1, shown in a transmission state.

As shown in FIG. 2-3, in certain embodiments, the moveable portion 114 includes one or more blocking structures 120 configured to prevent radiation from traveling from the transmitter channel 116 to the receiver channel 118 when the moveable portion is in the block state. In certain embodiments, the transmitter channel 116 and receiver channel 118 align with a respective transmit channel 122 and receive channel 124 of the optical transceiver 104.

Figure 5A:
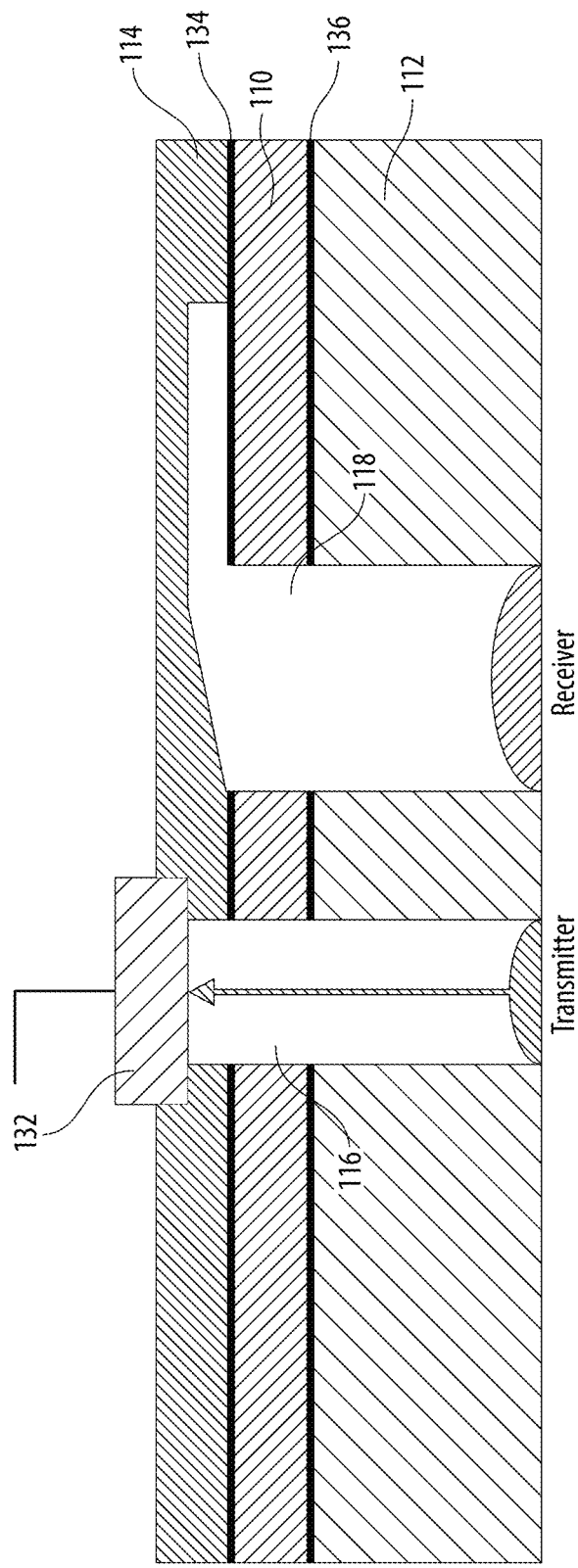
FIG. 5A is a schematic cross-sectional view showing the embodiment of FIG. 4 in a power sense state.
Figure 5B:
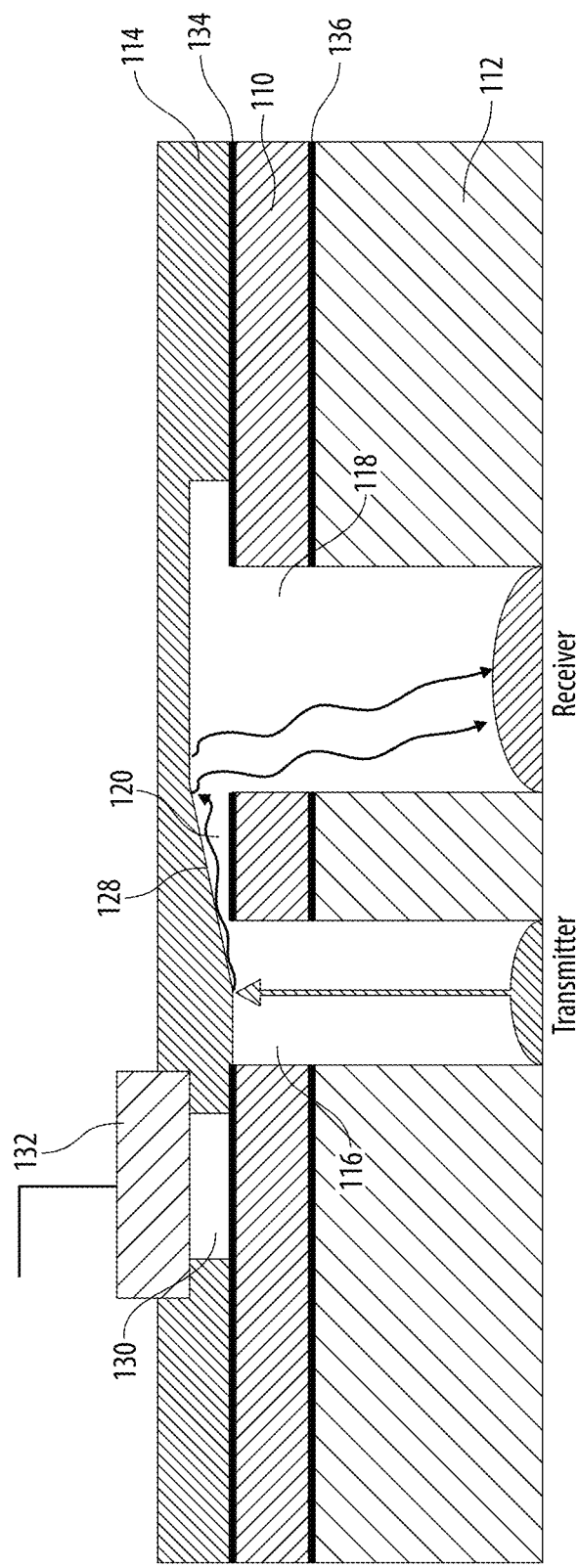
FIG. 5B is a schematic cross-sectional view of the embodiment of FIG. 5A, shown in a partial transmission state providing initial feedback to a receiver.
Figure 5C:
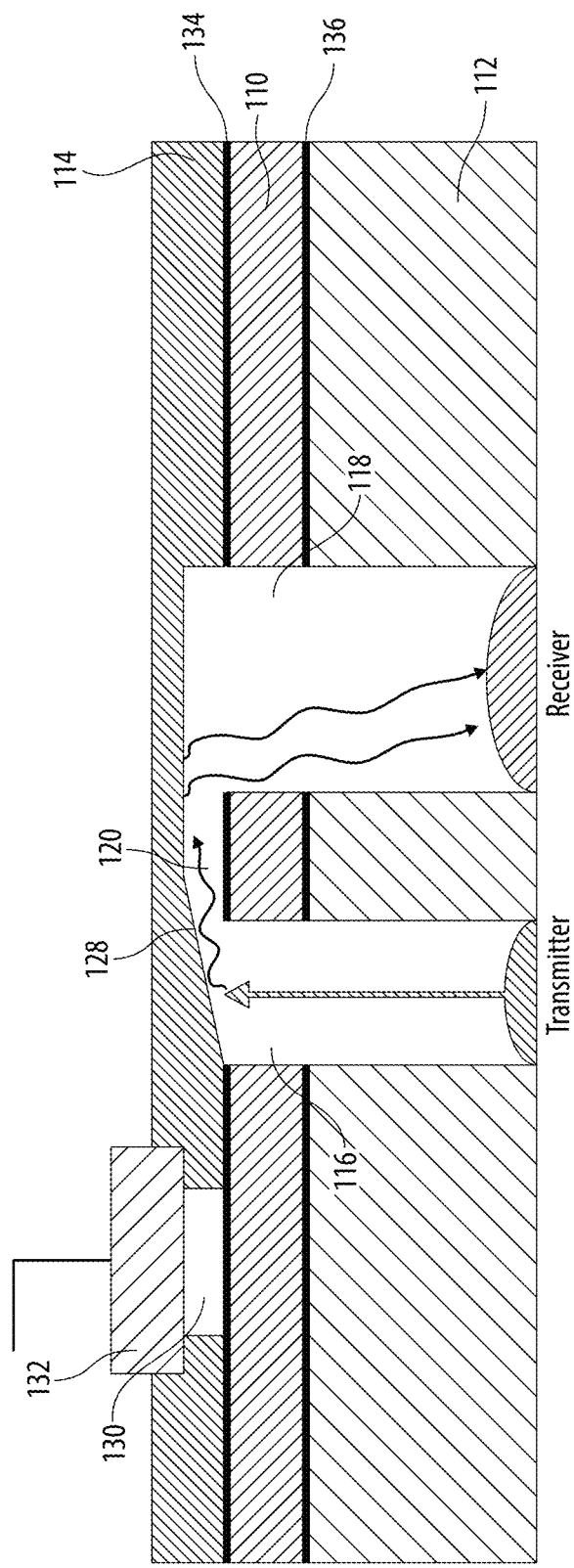
FIG. 5C is a schematic cross-sectional view of the embodiment of FIG. 5D, shown in a full transmission state providing maximum feedback to a receiver.
Figure 6:
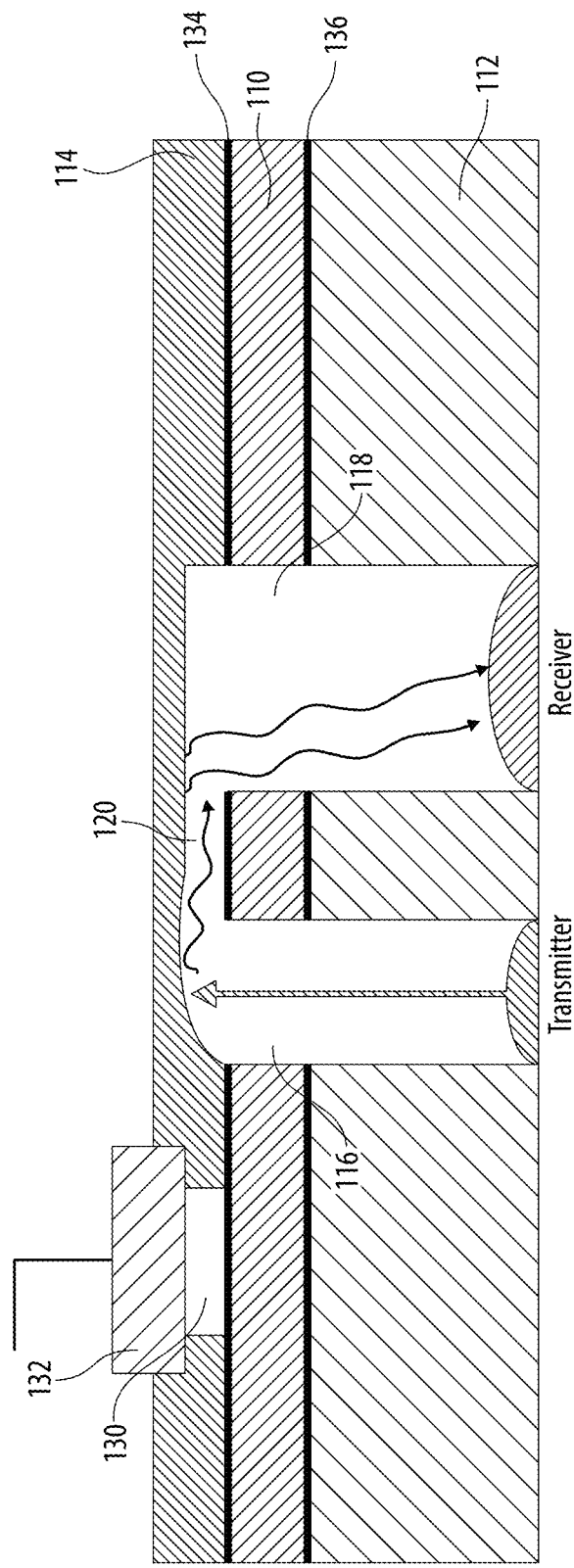
FIG. 6 is a schematic cross-sectional view of an embodiment of an apparatus in accordance with this disclosure, shown having a different shape incident surface and in a full transmission state providing maximum feedback to a receiver.

The moveable portion 114 can define a transmission aperture 126 dimensioned to allow at least some radiation to travel from the transmitter 106 to the receiver 108 in the one or more transmission states. The transmission aperture 126 can be configured to attenuate radiation from the transmitter 106 to reduce incident radiation power on the receiver 108 when in the one or more transmission states. In certain embodiments, the transmission aperture 126 can include an angled surface 128 configured to allow gradual transmission between the transmitter channel 116 and the receiver channel 118 based on a position of the movable portion 120 relative to the base portion 110 (e.g., as shown in FIGS. 5B and 5C). The angled surface can have a straight shape as shown in FIGS. 5A-5C, or can have a curved shape, e.g., as shown in FIG. 6. Any suitable variable shape is contemplated herein.

In certain embodiments, the moveable portion 120 can include optical power sensor opening 130 configured to receive an optical power sensor 132 and which can be in optical communication with the transmission channel 116 in a power sense state. The optical power sensor opening can include any suitable shape configured to receive and/or mount any suitable optical power sensor. In certain embodiments, the power sense state can be the block state such that the transmitter channel 116 and the receiver channel 118 are not in optical communication in the power sense state (e.g., as shown in FIG. 5A).

In certain embodiments, as shown in FIGS. 5A-C and 6, the apparatus can include a first gasket 134 between the movable portion 114 and the base portion 110 to prevent radiation leakage. The first gasket can respective openings for the transmitter channel and the receiver channel. In certain embodiments, the apparatus can include a second gasket 136 can be configured to be between the base portion 110 and the transceiver housing 112 to prevent radiation leakage. The second gasket 136 can have respective openings for the transmitter channel 116 and the receiver channel 118. In certain embodiments, the movable portion 120 can be made of a material and/or otherwise have optical properties configured to attenuate radiation from the transmitter 106 to the receiver 108 to a power level below a maximum limit of the receiver.

In certain embodiments, the moveable portion 120 can be mounted to the base portion 110 via one or more slotted fasteners to limit motion between a maximum transmission state of the one or more transmission states and the block state. In certain embodiments, the one or more slotted fasteners are configured to selectively compress the moveable portion 120 against the base portion 110 to fix the moveable portion 120 to the base portion 110 to hold a state of the apparatus 102.

In accordance with at least one aspect of this disclosure, a transceiver assembly 100 can include an optical transceiver 104 having a transmitter 106 and a receiver 108, and an optical apparatus 102. The optical apparatus 102 can be or include any suitable embodiment of an apparatus disclosed herein, e.g., as described above.

In certain embodiments the assembly described herein, provides a cover to allow testing of the optical transceiver device on the ground to protect ground crew from radiation exposure. In certain embodiments, the feedback apparatus (e.g., the cover for the optical transceiver) can be made of plastic. Embodiments can include, the cover having two general pieces with light seals there between. A base portion can magnetically mount to the transceiver (e.g., such that magnets in the center of the base portion interact with the metallic transceiver or other magnetic component in the transceiver). In certain embodiments, the magnets can be mechanically released with a switch (e.g., which can mechanically rotate polarity to release). The rotating portion can rotate relative to the base portion to define the states. Embodiments can include a cut out in the material to allow light transmission, e.g., as shown.

Embodiments can include provisions to align the cover to the transceiver telescope(s) through keying, for example. For example, in certain embodiments, the cover can include a set of connectors and the transceiver telescope(s) can include a corresponding set of connectors. The connectors on each of the cover and the transceiver telescope(s) can allow for the two to be mated together with the correct alignment.

Embodiments can include tightening and loosening a screw to turn the rotatable portion relative to a rubber gasket that acts as a light seal. Embodiments can include a plurality, e.g., four screws symmetrically disposed. Embodiments can include any suitable number of transmission channels and receiver channels based on the construction of the transceiver (e.g., four of each as shown in FIGS. 1-4).

Figure 4:
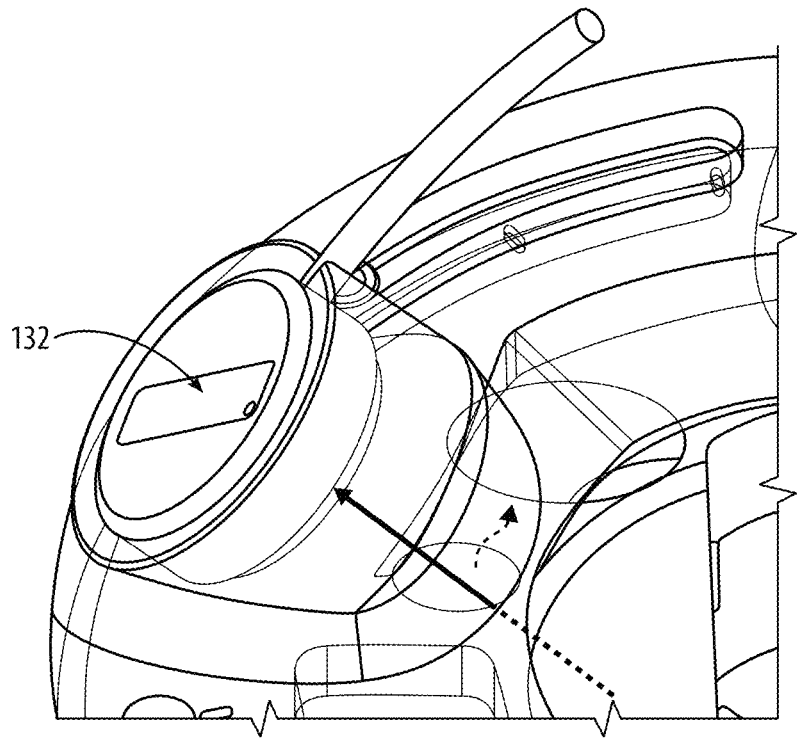
FIG. 4 is a partial view of another embodiment of an apparatus in accordance with this disclosure, shown having a power sensor.

In FIGS. 4 and 5A, for example, an embodiment of a zero feedback position is shown, where transmission light is cut-off. In this state, there can be zero light path to the receiver. In certain embodiments, the rotating portion can be rotated to an open feedback position where the cut-out opening or optical surface is disposed over both a laser output and transceiver opening or optical surface. The laser can now get to transmit to the receiver for testing. The amount of the channel that is exposed to the laser opening and the receiver opening can define the attenuation of the signal. Attenuation is also a function of the reflectivity of the material used where the channel is. These can be selected to have a desired attenuation, and embodiments can provide a variable attenuation based on a position of the moveable portion.

In FIG. 5B, an embodiment of an open feedback position state is shown, where transmission light can reflects into a cavity with a receiver, providing optical feedback between the transmitter and receiver. Embodiments can include three states: a power sensing state, an open feedback state, and a state where all light is blocked everywhere. Two states where light is blocked to the receiver but open to a power sensor, and a transmission state is contemplated herein (e.g., as shown in FIGS. 5A-5C).

FIGS. 4 and 5A show an embodiment of a zero-feedback transmission power measurement is shown where a power sensor can sense the power of the laser and can feed back into the system to calibrate the responsivity of the transceiver and ensure it is working properly as well. Embodiments can be used for both calibration and health diagnostics. In certain embodiments, the cover can be configured to transmit all the light from the transmit telescope through the cover, with the expectation that there will be detectors or power meter heads in place to collect that light and provide power level measurements for the light leaving that particular transmit telescope.

Embodiments can include, a curved/angled channel to smoothly introduce feedback into the receiver path. The amount of light sent into the receiver path can be variably controlled. This allows for rotation the rotating portion various amounts to control the amount of attenuation of the laser signal (e.g., embodiments can include a 50% or other fixed mark shown on the surface) for a desired testing level). In certain embodiments, it can be necessary to attenuate because the laser can be too strong and may damage the receiver if sent back at full power. Embodiments can include an enclosure that appends directly to an optical transceiver head made up of optical transmission and reception telescopes. Certain optical transceivers can require the transmission of a high-powered laser source into the atmosphere and reception of backscattered light in order to interpret air data parameters. The enclosure can be light sealed, preventing optical transmission external to the enclosure. Internal to the enclosure, the assembly is mechanically adjustable such that apertures internal to the enclosure produce an overlap resulting in an optical pathway from the transmit telescope to the receive telescope on the optical transceiver head. This optical pathway can be adjusted to vary the amplitude of light feedback. In certain embodiments there can be a preset orientation that directs all transmission light to an optical power meter, providing another critical system metric. Appending certain embodiments to the optical transceiver establishes a light seal and eliminates laser transmission external to feedback apparatus.

Embodiments can contain light transmission in a small package that provides an optical path back to the receiver allows for safe on ground operation and system performance assessment. Embodiments can be used for an aircraft installation application but could extend to a laboratory or production environment for example, or any other suitable use. Embodiments can be incorporated into a tool for product acceptance testing and/or field maintenance testing of optical sensors, such as laser air data systems.

Embodiments can include an enclosure that appends directly to an optical transceiver head made up of optical transmission and reception telescopes. The enclosure can be light sealed, preventing optical transmission external to the enclosure. Internal to the enclosure, the assembly is mechanically adjustable such that apertures internal to the enclosure produce an overlap resulting in an optical pathway from the transmit telescope to the receive telescope on the optical transceiver head. This optical pathway can be adjusted to vary the amplitude of light feedback. Embodiments can further include a preset orientation that directs all transmission light to an optical power meter, providing another critical system metric.

Embodiments can include a multi-function, integrated, probe cover which can provide protection to an optical transceiver and provide test safety for users.

Embodiments can include a system wherein there is transmission of a high powered laser source into the atmosphere and reception of backscattered light through an optical transceiver. Containing this light transmission in a small package that provides an optical path back to the receiver allows for safe on ground operation and performance assessment.

Embodiments of a apparatus can be placed in an orientation that blocks the beams and eliminates issues regarding laser eye safety. Embodiments of an apparatus can be placed in an orientation that also provides feedback to the receive channels for testing of the system. Embodiments of an apparatus can be a protective cover that can be used to protect the transceiver optical surfaces while the aircraft is on ground.

Embodiments can allow for easy maintenance and testing of the system on-wing in addition to providing user safety. Further, the operational cost of manual steps to perform maintenance and testing to a specifically designed optics head can be reduced, by reducing the installation and test time.

Additionally, embodiments can provide protection from fluids, contaminants, oils, etc. which could damage the transceiver. In certain embodiments, the apparatus can be kept on during de-icing functions and then removed.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. An optical apparatus configured to cover an optical transceiver, at least a portion of the apparatus being configured to move relative to the transceiver between a block state wherein the apparatus is configured to block transmission from a transmitter of the optical transceiver to a receiver of the optical transceiver as well as block emission from the transmitter to the atmosphere, and one or more transmit states wherein the apparatus is configured to allow at least partial transmission from the transmitter of the optical transceiver to a receiver of the optical transceiver while blocking emission from the transmitter to the atmosphere.

2. The apparatus of claim 1, further comprising:
a base portion configured to attach to an optical transceiver; and
a movable portion connected to the base portion and configured to move relative to the base portion between the block state and the one or more transmission states.

3. The apparatus of claim 2, wherein the base portion comprises:
a transmitter channel defined through the base portion and configured to allow optical communication between the transmitter of the optical transceiver and the moveable portion; and
a receiver channel defined through the base portion and configured to allow optical communication between the receiver of the optical transmitter the moveable portion.

4. The apparatus of claim 3, wherein the moveable portion includes one or more blocking structures configured to prevent radiation from traveling from the transmitter channel to the receiver channel when the moveable portion is in the block state.

5. The apparatus of claim 4, wherein the transmitter channel and receiver channel align with a respective transmit channel and receive channel of the optical transceiver.

6. The apparatus of claim 5, the moveable portion defines a transmission aperture dimensioned to allow at least some radiation to travel from the transmitter to the receiver in the one or more transmission states.

7. The apparatus of claim 6, wherein the transmission aperture is configured to attenuate radiation from the transmitter to reduce incident radiation power on the receiver when in the one or more transmission states.

8. The apparatus of claim 7, wherein the transmission aperture includes an angled surface configured to allow gradual transmission between the transmitter channel and the receiver channel based on a position of the movable portion relative to the base portion.

9. The apparatus of claim 8, wherein the moveable portion can further include an optical power sensor opening configured to receive an optical power sensor, and to be in optical communication with the transmission channel in a power sense state.

10. The apparatus of claim 9, wherein the power sense state is the block state such that the transmitter channel and the receiver channel are not in optical communication in the power sense state.

11. The apparatus of claim 2, further comprising a first gasket between the movable portion and the base portion to prevent radiation leakage, the first gasket having respective openings for the transmitter channel and the receiver channel.

12. The apparatus of claim 11, further comprising a second gasket configured to be between the base portion and the transceiver housing to prevent radiation leakage, the second gasket having respective openings for the transmitter channel and the receiver channel.

13. The apparatus of claim 2, wherein the movable portion is made of a material and/or otherwise has optical properties configured to attenuate radiation from the transmitter to the receiver to a power level below a maximum limit of the receiver.

14. The apparatus of claim 2, wherein the moveable portion is mounted to the base portion via one or more slotted fasteners to limit motion between a maximum transmission state of the one or more transmission states and the block state.

15. The apparatus of claim 14, wherein the one or more slotted fasteners are configured to selectively compress the moveable portion against the base portion to fix the moveable portion to the base portion to hold a state of the apparatus.

16. A transceiver assembly, comprising:
an optical transceiver having a transmitter and a receiver; and
an optical apparatus configured to cover the optical transceiver, at least a portion of the apparatus being configured to move relative to the transceiver between a block state wherein the apparatus is configured to block transmission from the transmitter of the optical transceiver to the receiver of the optical transceiver as well as block emission from the transmitter to the atmosphere, and one or more transmit states wherein the apparatus is configured to allow at least partial transmission from the transmitter of the optical transceiver to a receiver of the optical transceiver while blocking emission from the transmitter to the atmosphere.

17. The assembly of claim 16, further comprising:
a base portion configured to attach to an optical transceiver; and
a movable portion connected to the base portion and configured to move relative to the base portion between the block state and the one or more transmission states.

18. The assembly of claim 17, wherein the base portion comprises:
a transmitter channel defined through the base portion and configured to allow optical communication between the transmitter of the optical transceiver and the moveable portion; and
a receiver channel defined through the base portion and configured to allow optical communication between the receiver of the optical transmitter the moveable portion.

19. The assembly of claim 18, wherein the moveable portion includes one or more blocking structures configured to prevent radiation from traveling from the transmitter channel to the receiver channel when the moveable portion is in the block state.

\* \* \* \* \*